United States Patent [19]

Esmay

[11] Patent Number: 4,527,870
[45] Date of Patent: Jul. 9, 1985

[54] PORTABLE ILLUMINATED OPTICAL FIBER MICROSCOPE

[75] Inventor: Edward N. Esmay, Webster, N.Y.

[73] Assignee: Bausch & Lomb Incorporated, Rochester, N.Y.

[21] Appl. No.: 460,522

[22] Filed: Jan. 24, 1983

[51] Int. Cl.³ .......................................... G02B 21/06
[52] U.S. Cl. .................................. 350/523; 350/526; 350/527
[58] Field of Search ............................... 350/523–528, 350/507, 569, 511–513; 356/73.1

[56] References Cited

U.S. PATENT DOCUMENTS

| 2,103,230 | 12/1937 | Benford et al. | 350/525 |
| 2,184,750 | 12/1939 | Meinhardt et al. | 350/512 |
| 4,361,377 | 11/1982 | Pullen | 350/523 |

FOREIGN PATENT DOCUMENTS

| 103445 | 5/1926 | Fed. Rep. of Germany | 350/527 |
| 2842316 | 4/1980 | Fed. Rep. of Germany | 356/73.1 |
| 62166 | 6/1968 | German Democratic Rep. | 350/512 |

OTHER PUBLICATIONS

Burtsev et al., "Projection Instrument for Inspecting Glass-Fiber Bundles", Sov. J. Opt. Technol. 2-1981, pp. 78-79.

Marcuse et al., "Automatic Geometric Measurements of Single-Mode & Multimode Optical Fibers", App. Optics 2-1-79, pp. 402-408.

Primary Examiner—William H. Punter
Attorney, Agent, or Firm—John S. Norton

[57] ABSTRACT

A portable microscope for inspecting fiber optic cables has an illumination system including a selectively positionable light occluder which permits end examination of a cable when in a first position and examination of the optical transmission of the cable when in a second position.

8 Claims, 4 Drawing Figures

PORTABLE ILLUMINATED OPTICAL FIBER MICROSCOPE

CROSS-REFERENCE TO RELATED APPLICATIONS

This application is related to concurrently filed and copending application Ser. No. 460,525 entitled "Rotatable Specimen Mount for Optical Fiber Microscopes" for inventors W. Bridson and E. Esmay and to Ser. No. 455,082 entitled "Design For An Optical Fiber Microscope" filed Jan. 3, 1983 for inventor R. Henderson which issued Sept. 18, 1984 as U.S. Pat. No. Des. 275,575.

BACKGROUND OF THE INVENTION

The present invention is directed toward a portable compact microscope for use in examining fiber optic cables.

With the advent of fiber optic cables and, particularly, with their useage in the field of communication, it has become increasingly evident that some means of checking the quality of each fiber optic cable is needed at the point of installation where service personnel will be cutting, polishing and joining the cables, as well as at the point of manufacture.

Up until the present time, it has been the practice of those doing such inspections to employ, for instance, a conventional microscope which has been altered to hold the end of a fiber optic cable. These altered microscopes include no lighting provisions, requiring the service personnel to illuminate the cable with auxiliary lighting. Service personnel who quite often must operate in environmental and lighting conditions which are less than ideal, find the altered microscopes cumbersome and difficult to handle.

An example of a portable microscope which features a self-contained light source may be seen in U.S. Pat. No. 4,361,377 which issued Nov. 30, 1982 to Joel F. Pullen. The subject of this invention is a portable microscope which may be used for examining slides in a medical examination room setting.

SUMMARY OF THE INVENTION

A dual mode microscope illumination system for examining the ends of fiber optic cables in one mode and, in the second mode, examining the entire cable for proper transmission. The microscope has a self-contained light source and an occluder which is movable from one position to another being to control the light according to the examination being conducted.

Thus by being able to thoroughly and closely examine the fiber optic cables for proper end finish, as well as optical transmission, the chances of installing a faulty cable are greatly reduced. Conversely, if a faulty cable has already been installed, this device may be used to find it quickly and efficiently.

It will be appreciated that examination of fiber optic cable is especially important at the site of installation where it is necessary for service personnel to cut the fiber cable and polish the end prior to connecting to, for instance, another cable. Presently, the cables must be jointed at distances of approximately every three-fourths of a mile. Obviously, with the use of fiber optic cables growing rapidly, with installation sometimes running into thousands of miles per job, it is imperative that the proper end connections between cables be guaranteed. Also, it is obvious that the optical transmission of the cable to be installed must be inspected before the cable has been installed. The microscope as set forth and described hereinabove provides such capability to service personnel responsible for conducting such examinations.

The preferred embodiment will be detailed hereinafter.

DETAILED DESCRIPTION OF THE PREFERRED EMBODIMENT

Figures 1, 2:
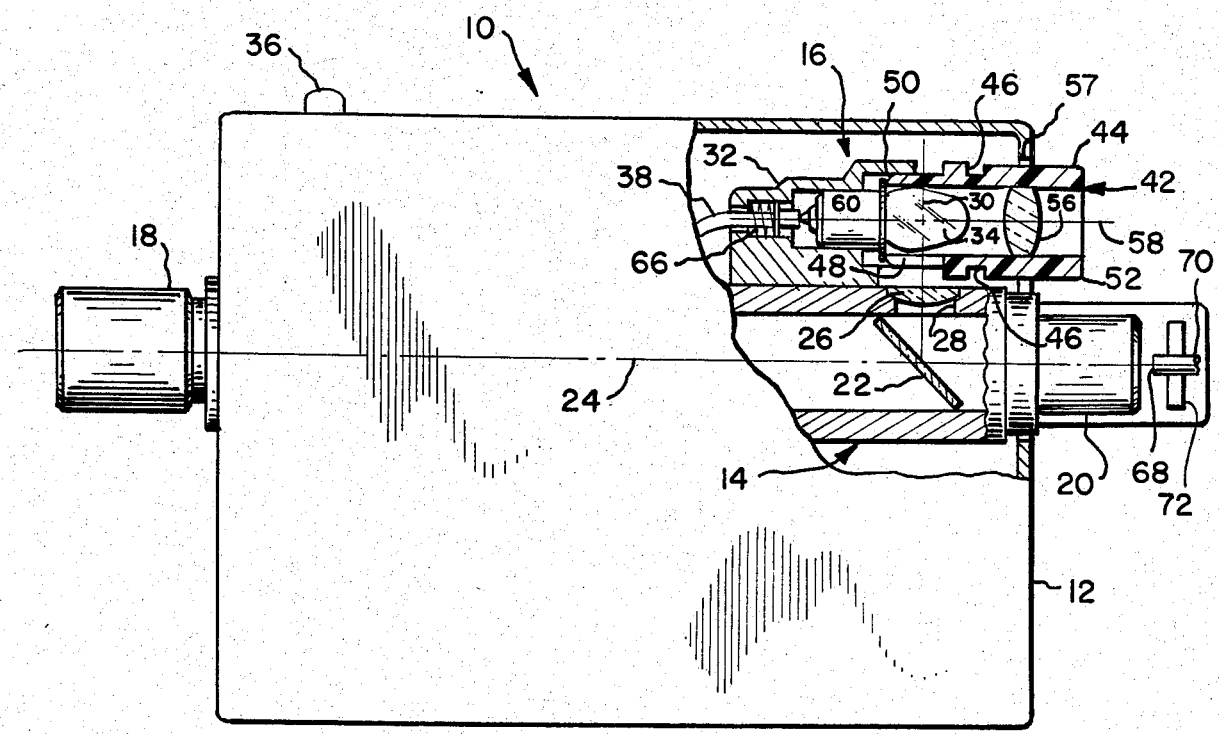
FIG. 1 is a partially sectioned plan view of a compact portable microscope for inspecting fiber optic cables.
FIG. 2 is a partial top view of the light occluder/lens assembly shown in FIG. 1.

A compact portable microscope 10 comprises a housing 12, an optical tube assembly 14 and an illumination system 16. The optical tube assembly 14, which is conventionally known as a straight tube microscope, includes an eyepiece 18 and an objective 20. A beam splitter 22 is mounted in the tube assembly 14 along optical axis 24 between the eyepiece 18 and the objective 20. A diffusing lens 26 is mounted in an aperture 28 in tube assembly 14 along axis 30 which is transverse to axis 24.

The illumination system 16 includes a lamp socket 32 which has a lamp 34 mounted therein. The lamp 34 is connected to a source of power (not shown) and is controllable by switch 36 through wire 38. The lamp socket assembly 32 includes a pair of locating pins 40, as best seen in FIG. 2, which will be more fully described hereinafter.

Figure 3:
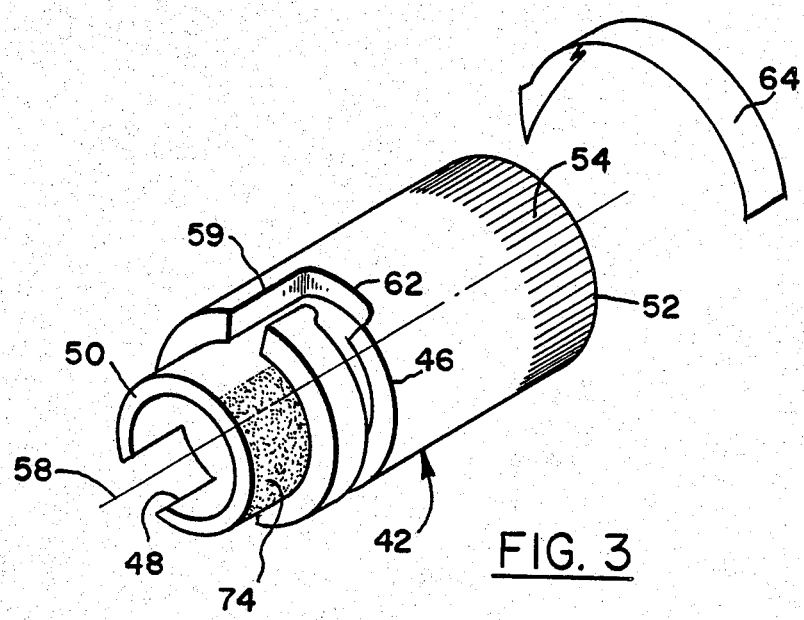
FIG. 3 is a perspective view of the light occluder/lens assembly device shown in FIG. 1.

An occluder/lens assembly 42 includes a tubular body 44 which has a pair of external cam slots 46, one of which is illustrated in FIG. 3. An aperture 48 is formed in tubular body 44 proximate one end 50 thereof. The opposite end 52 has a knurled portion 54. A focusing lens 56 is mounted, or integrally formed in tubular body 44.

The occluder/lens assembly 42 is assembled to lamp socket assembly 32 through housing aperture 57 by aligning locating pins 40 with ramps 59 of cam slots 46, one of which is illustrated in FIG. 3. To assemble, the occluder/lens assembly 42 is pressed inwardly along axis 58 toward the lamp socket assembly 32. Once the locating pins 40 bottom against the rearward edges 62 of cam slots 46, the occluder/lens assembly 42 is rotated in direction of arrow 64 of FIG. 3 to initially align aperture 48 with axis 30, as illustrated in FIG. 1. Wire 38 has a spring biased contact 66 which urges lamp flange 60 against end 50 of occluder/lens assembly 42 which, in turn, exerts pressure against locating pins 40 by cam slots 46. The occluder/lens assembly 42 is thereby held firmly in place with the aperture 48 aligned with axis 30 and diffusing lens 26.

Figure 4:
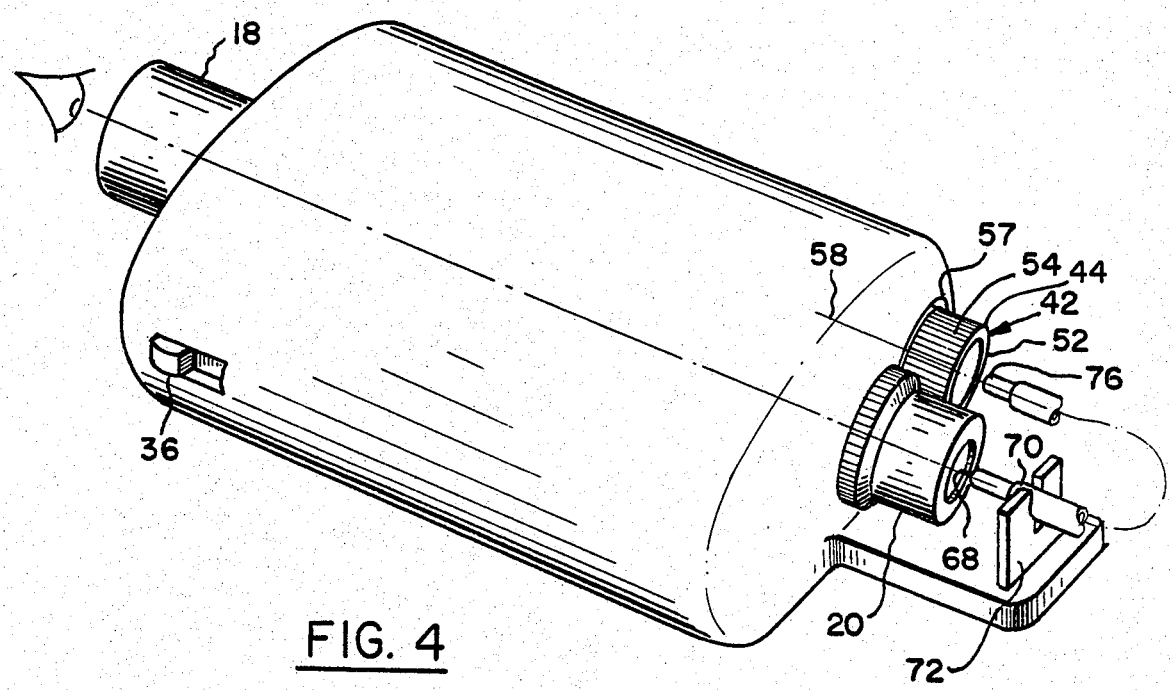
FIG. 4 is a perspective view of the microscope.

To examine the end 68 of a fiber optic cable 70, the cable would be mounted to, for instance, a fixture 72 as best seen in FIGS. 1 and 4 which would align the end 68 with respect to objective 20. Switch 36 would be turned on to supply power to lamp 34. Light emitted by lamp 34 passes along axis 30 through aperture 28 and diffusing lens 26 to beam splitter 22 where it is directed along axis 24 between the eyepiece 18 and objective 20. The incident light emitted illuminates the end 68 of the fiber optic cable 70 so that it may be examined for flaws. The diffusing lens 26 which is interspersed between the lamp 34 and the beam splitter 22 is required to prevent the image of the lamp from being visible through the eyepiece 18.

Because of the length of cam slots 46, the occluder/lens assembly 42 may be rotated in the direction of arrow 64 by grasping knurled end 54 to move the aperture 48 from the position shown in FIG. 1 to another position where an opaque surface 74, as best illustrated in FIG. 3, would be aligned with axis 30 to block light from passing through diffusing lens 26 to beam splitter 22. Illumination from lamp 34 would therefore only pass out of the occluder/lens assembly 42 through focusing lens 56.

With end 68 of cable 70 in place in front of objective 20, as previously described and as best sen in FIGS. 1 and 4, the opposite end 76 of the fiber optic cable, which is quite frequently available to the service personnel, may be positioned before the focusing lens 56. Light transmitted through the focusing lens enters end 76 providing illumination for the entire fiber optic cable 70 as well as the optical tube assembly 14. The characteristics of the light passing through the cable 70 may be observed to determine the optical transmission of the cable.

The foregoing description is given by way of example only and should not be considered a limitation. It is contemplated that changes and modifications may be made in the present invention without departing from the spirit or scope thereof.

What is claimed is:

1. A microscope for inspecting fiber optic cables, comprising:
   (a) a housing having an opening therein;
   (b) an optical system including a first axis, and an eyepiece, a beam splitter and an objective positioned along said first axis;
   (c) a light source positioned in said housing along both a second axis, which intersects said first axis at said beam splitter, and a third axis, which passes through said opening in said housing, whereby said light source is capable of providing illumination along said first, second and third axes; and
   (d) a light occluder selectively positionable across said second axis, whereby illumination from said light source is blocked from said first axis when said light occluder is in a first position across said second axis and illumination from said light source is provided along said first, second and third axes when said light occluder is in a second position removed from said second axis.

2. The microscope according to claim 1, wherein said optical system is mounted in an optical tube supported by said housing.

3. The microscope according to claim 2, wherein said optical tube assembly includes means thereon for rotatably mounting said light occluder with respect to and about said third axis.

4. The microscope according to claim 3, wherein said light occluder includes an aperture therein alignable with said second axis when said light occluder is in said second position.

5. The microscope according to claim 4, wherein at least a portion of said light occluder adjacent said aperture is opaque, said opaque portion intersecting said second axis when said light occluder is in said first position.

6. The microscope according to claim 1, wherein said light occluder includes a focusing lens.

7. The microscope according to claim 1, wherein said light occluder is introduceable, to or removable from, said housing through said aperture therein.

8. The microscope according to claim 5, wherein said light occluder is introduceable, to or removable from, said housing through said aperture therein.

* * * * *